(12) United States Patent
Bessey et al.

(10) Patent No.: US 6,403,196 B1
(45) Date of Patent: Jun. 11, 2002

(54) RIGID FIBER NETWORK STRUCTURES HAVING IMPROVED POST-YIELD DIMENSIONAL RECOVERY, METHOD OF MAKING SAME, AND ARTICLES INCORPORATING SAME

(75) Inventors: William E. Bessey; Joseph S. W. Haas, both of Charlotte, NC (US); Gerald Peter Rumierz, Tega Cay, SC (US); Clinton Dale Felton, Charlotte, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 08/976,650

(22) Filed: Nov. 24, 1997

(51) Int. Cl.⁷ .................................................. B32B 3/00
(52) U.S. Cl. ........................ 428/166; 428/167; 428/169; 428/174
(58) Field of Search ................................ 428/174, 175, 428/176, 178, 212, 225, 229, 253, 257, 246, 251, 284, 285, 286, 287, 136, 166, 167, 169; 264/258

(56) References Cited

U.S. PATENT DOCUMENTS

| 4,631,221 A | * | 12/1986 | Disselbeck et al. | |
| 4,890,877 A | | 1/1990 | Ashtiani-Zarandi et al. | 296/146 |
| 5,158,821 A | * | 10/1992 | Gebauer et al. | |
| 5,364,686 A | * | 11/1994 | Disselbeck et al. | |
| 5,447,776 A | * | 9/1995 | Disselbeck | |
| 5,731,062 A | * | 3/1998 | Kim et al. | |

FOREIGN PATENT DOCUMENTS

| DE | 38 44 458 A | 7/1990 |
| EP | 0 324 714 A | 7/1989 |
| EP | 0 469 558 A | 2/1992 |
| EP | 0 512 431 A | 11/1992 |
| WO | WO 97/23179 | 7/1997 |

* cited by examiner

*Primary Examiner*—Merrick Dixon
(74) *Attorney, Agent, or Firm*—Jenkins & Wilson, P.A.

(57) ABSTRACT

A rigid three-dimensionally shaped fiber network structure having improved post-yield dimensional recovery is provided. The fiber network structure is formed from a fabric containing (A) at least one oriented, semi-crystalline monofilament yarn made from a first thermoplastic polymer, and (B) a second thermoplastic polymer which effects bonding of the monofilament cross-over points. The fiber network structures are useful in a variety of articles, including sandwich panels, various spacers, drainage systems, and energy absorption structures.

16 Claims, No Drawings

RIGID FIBER NETWORK STRUCTURES HAVING IMPROVED POST-YIELD DIMENSIONAL RECOVERY, METHOD OF MAKING SAME, AND ARTICLES INCORPORATING SAME

BACKGROUND OF THE INVENTION

This invention relates to shaped fiber network structures. More particularly, this invention relates to three-dimensionally shaped fiber network structures which are rigid and have improved post-yield dimensional recovery. Furthermore, this invention relates to improved methods of making such structures and to articles incorporating such structures.

Three-dimensionally shaped fiber network structures and methods of making them are known in the art.

For example, such structures have been made by multi-step processes involving impregnating a fabric with a high level of thermoset resin, deforming the resin-impregnated fabric into the desired network shape, and then curing the thermoset resin so as to lock the structure in such desired shape. These methods are taught, for example, in U.S. Pat. Nos. 4,631,221; 4,890,877; 5,158,821; and 5,447,776.

The resin-based network structures formed by the process described above have several disadvantages. For example, both the compression properties and the stiffness properties of the resin-based network structures (which are derived from conventional textile-type yarns) are determined by the type and amount of resin present in the structure. In fact, resin loading is the limiting factor in network stiffness. Increasing the stiffness of the network structure requires progressively higher loadings of resin. A typical resin-based network will contain more than 50% by weight of thermoset resin. Very stiff network structures are usually in the form of composites constructed by nesting single network structures.

The prior art resin-based networks are composed of multifilament yarns and a stiff but brittle matrix material. When the dome structures in these networks are compressed, the network elements are bent. Because all of the fiber crossover points are tightly bonded, bending is highly localized, i.e., bending occurs in the short lengths between the fiber crossover points. Even at small dome compressions, some network elements are highly strained while others are under no strain. Kinking (brittle failure) of the most highly bent elements occurs at low overall network compressions (less than 30%). Once an element kinks, it behaves like a hinge and offers no further resistance to bending. The network has yielded and offers reduced resistance to further compression. Since the kinking or buckling is permanent, the network cannot recover its original height or shape when the kink-inducing compression is removed. Because the network structure cannot recover its original height or shape when its yield load has been exceeded, the network structure is described herein as having "low post-yield dimensional recovery".

Another drawback of the prior art resin-based network structures is that their maximum stiffness tends to be limited by the natural tendency of textile yarns to flatten, thus presenting the thinnest, softest cross-section when bent.

Because the prior art resin-based network structures are usually stiff and brittle and suffer permanent deformation when compressed beyond 10% to 20% of their thickness, the use of such network structures is generally limited to light-weight structural applications.

The prior art process described previously herein for making the resin-based network structures discussed above also has drawbacks. For example, the process requires a separate costly initial resin treatment. In addition, the fabric used in the process is not particularly stable since, until its deformation, the fabric must be maintained at a temperature below the curing temperature of the resin. Furthermore, the deformation process is time-consuming since it is controlled by the amount of time required to heat up the mold, the fabric and the resin and the amount of time required to cure the resin. Thus, although the prior art resin-based network structures have found use in a number of applications such as, e.g., building panels, automotive doors, flooring systems, and geotextiles, use of these network structures is limited primarily by the high cost of making them.

To overcome the difficulties associated with the above-described resin-based process, methods of making resin-free three-dimensionally shaped fiber network structures were introduced. For example, resin-free network structures have been formed using multifilament yarn textile fabrics consisting of high melting temperature reinforcing filaments and lower melting temperature thermoplastic matrix filaments, wherein the network structure is formed by melting the matrix filaments, forming the desired network shape, and re-solidifying the matrix material prior to demolding. Such a method and resin-free structure are disclosed, e.g., in U.S. Pat. No. 5,364,686.

The properties of the resin-free network structure formed by the process described in U.S. Pat. No. 5,364,686 are similar to those of the aforementioned resin-based network structures. Although simpler and cleaner than the methods for making the resin-based network structures, the method described in U.S. Pat. No. 5,364,686 for making resin-free network structures is extremely slow because the matrix polymer must be melted, shaped and then cooled below its melting temperature and allowed to harden sufficiently so that the network shape can be maintained prior to demolding.

A drawback to both the resin-based and resin-free prior art processes described hereinabove is that before the deformed network structure can be removed from the mold the thermoset resin must be cured in the resin-based process or the low melting thermoplastic must solidify in the resin-free process. This is time-consuming.

Another drawback to the resin-based and resin-free prior art processes described hereinabove is that both processes use multifilament yarns to form the network structures therein. The use of multifilament yarns to form such network structures has several disadvantages. For example, multifilament yarns generally cannot support their own weight unless the individual fibers therein are bonded together (i.e., the multifilament yarns are "limp"). However, bonded multifilament yarns are also disadvantageous in that they can delaminate along weaknesses when they are flexed and consequently become dramatically softer. In addition, multifilament yarns tend to flatten to form the softest cross-section, i.e., a ribbon, during the network-forming process. This limits the achievable compression modulus.

Both the resin-based and resin-free network structures produced by the prior art processes described above are rigid, quasi-brittle structures. Both types of structures are stiff and can be deformed only a limited amount before yielding and acquiring a permanent deformation.

More recently, resin-free three-dimensionally shaped fiber network structures have been formed using large-diameter thermoplastic polymer monofilaments having a diameter of at least about 0.1 millimeter. Such monofilament-based structures are disclosed, for example, in copending, commonly assigned U.S. patent application Ser. No. 08/577,655 to Kim et al., filed Dec. 22, 1995.

In the monofilament-based network structures disclosed in the Kim et al. application, the limp multifilament yarns and brittle resins are replaced with large diameter monofilament yarns. When these network structures are compressed, the stiff monofilament yarns are bent. However, since the fiber crossover points are not bonded, the total bending strain is distributed over longer lengths of yarn. The resistance to compression can still be significant but the local fiber strains are much lower than in the rigid networks. These networks can sustain much greater total compression, e.g., 60% or more, without any fiber kinking. Consequently, these networks are intrinsically softer than the prior art rigid networks but are highly resilient. Recovery from repeated 50% compressions is typically 95% to 100%.

Because of the bending stiffness of the large-diameter monofilaments used therein, the network structures formed by the Kim et al. method exhibit a nearly Hookean resistance to compression and exhibit excellent recovery from multiple compressions up to at least 50% of their original height. Unfortunately, the springiness and high deflections of such network structures under working loads make these structures too soft for many industrial and structural applications such as, for example, lightweight cores for sandwich panels and structural spacers.

Thus, it would be desirable to provide a network structure and method of making same, wherein the network structure has both improved post-yield dimensional recovery and sufficient rigidity to be useful in industrial and structural applications such as, e.g., the aforementioned lightweight cores for sandwich panels and structural spacers.

Therefore, it would be desirable to provide a network structure and a method of making same wherein the structure and method overcome the difficulties associated with the prior art resin-based, resin-free, and monofilament-based network structures and methods described hereinabove.

Accordingly, a primary object of this invention is to provide a three-dimensionally shaped fiber network structure which has improved post-yield dimensional recovery and improved rigidity.

A further object of this invention is to provide a three-dimensionally shaped fiber network structure having improved post-yield dimensional recovery and rigidity, wherein the structure does not depend upon high levels of a bonding agent to achieve acceptable stiffness levels.

Still another object of this invention is to provide a three-dimensionally shaped fiber network structure having improved post-yield dimensional recovery and rigidity, wherein the structure has optimum elemental cross sections for bending resistance.

A further object of this invention is to provide a relatively economical, fast and easy method of making a three-dimensionally shaped fiber network structure having the properties set forth in the preceding objects.

A still further object of this invention is to provide a method of making a three-dimensionally shaped fiber network structure having the properties set forth in the preceding objects, wherein the deformed network structure has sufficient initial stiffness that it can be removed from the mold immediately after the deformation process.

Another object of this invention is to provide articles composed of a three-dimensionally shaped fiber network structure having the properties set forth in the preceding objects.

These and other objects which are achieved according to the present invention can be discerned from the following description.

SUMMARY OF THE INVENTION

The present invention is based in part on the discovery that heated, semi-crystalline, oriented thermoplastic monofilaments can be rapidly shaped into stable three-dimensionally shaped fiber network structures. Thus, the use of such monofilaments provides a relatively fast, simple and economical method of making such structures. The present invention is further based on the discovery that such network structures can be made surprisingly stiff by the simple expedient of bonding the fiber cross-over points in the monofilament yarn. In addition, the present invention is based on the discovery that network structures based on semi-crystalline, oriented thermoplastic monofilaments are have greater post-yield dimensional recovery properties than do multifilament-based network structures.

Accordingly, one aspect of the present invention is directed to a rigid three-dimensionally shaped fiber network structure having improved post-yield dimensional recovery, wherein the structure contains a deformed sheet-like textile fabric having a base region and a plurality of deformations formed as a two-dimensional array on the base region. The deformed fabric is composed of:

(A) at least one oriented, semi-crystalline monofilament yarn formed from a first thermoplastic polymer and being disposed in the fabric so as to provide a plurality of monofilament cross-over points therein; and (B) a second thermoplastic polymer disposed in the fabric so as to effect bonding of all or substantially all of the monofilament cross-over points, the second thermoplastic polymer having a melting point which is lower than the melting point of the first thermoplastic polymer and higher than the glass transition temperature of the first thermoplastic polymer.

In the network structure of this invention, the second thermoplastic polymer functions as a bonding agent which bonds the monofilament yarn at the monofilament cross-over points or intersections after the network structure has been formed.

A second aspect of the present invention is directed to a method of making the aforementioned three-dimensionally shaped fiber network structure. Such method involves the steps of:

(1) providing a fabric-forming composition containing the above-described (a) oriented, semi-crystalline monofilament yarn(s) formed from a first thermoplastic polymer and (b) the second thermoplastic polymer, the second thermoplastic polymer having a melting point which is lower than the melting point of the first thermoplastic polymer and higher than the glass transition temperature of the first thermoplastic polymer;

(2) subjecting the fabric-forming composition to a fabric-forming process so as to form a deformable fabric having a plurality of monofilament cross-over points;

(3) subjecting the deformable fabric to an area-enlarging deformation process in a shaping mold at an elevated temperature so as to form an initial, resilient, self-supporting network structure composed of a deformed fabric having a three-dimensional shape, the deformed fabric containing a base region and a plurality of deformations disposed as a two-dimensional array on the base region, the elevated temperature being higher than the melting point of the second thermoplastic polymer and lower than the melting point of the first thermoplastic polymer so as to melt the second thermoplastic polymer and permanently deform the first thermoplastic polymer, the molten second thermoplastic polymer being disposed in contact with the monofilament cross-over points, the initial network structure having sufficient stiffness to maintain the three-dimensional shape thereof prior to hardening of the molten second thermoplastic polymer;

(4) removing the initial network structure from the mold; and (5) in the demolded network structure, causing the molten second thermoplastic polymer to harden so as to bond the monofilament cross-over points, thereby converting the initial network structure into a rigid three-dimensionally shaped network structure having improved post-yield dimensional recovery.

Alternatively, bonding may be achieved by incorporating the second thermoplastic polymer into the undeformed base fabric, melting the second thermoplastic polymer immediately before or during the deformation process, and then cooling and resolidifying the molten polymer after the network structure has been removed from the shaping mold (i.e., after the network structure has been demolded).

A third aspect of the present invention is directed to articles incorporating the fiber network structure of this invention.

The production of rigid, three-dimensionally shaped fiber network structures from semi-crystalline, oriented monofilament yarn instead of from multifilament yarn as is done in the prior art processes described previously herein has numerous advantages, both in terms of the product and the process.

For example, because the monofilament yarn is the primary source of stiffness of the network structure of this invention, the ultimate properties of such network structure are much less dependent on the choice and level of bonding agent than are the above-described resin-based network structures of the prior art. In the method of the present invention, the hardening of the second thermoplastic polymer can be delayed until after the network structure has been demolded. This is because the large-diameter monofilament yarn is stiff enough to support the network structure even if the network structure is removed from the mold before the second thermoplastic polymer solidifies. The prior art methods for making fiber network structures require that the thermoset resin be cured or the low melt thermoplastic be hardened before demolding of the network structure can occur. One reason for this is that multifilament yarns cannot support their own weight unless the individual fibers are bonded together. Therefore, unlike the multifilaments used in the prior art processes, the semi-crystalline, oriented, large-diameter monofilament yarn used in the method of this invention easily maintain its shape without the benefit of a stiffening system such as a thermoset resin or a second thermoplastic polymer.

In addition, because of the intrinsic stiffness of the monofilament yarn and the need to bond only the monofilament cross-over points as opposed to bonding the individual filaments together as in the multifilament version, a significantly lower amount of the second thermoplastic polymer can be used in the present invention to achieve high stiffness values than is the case in the prior art processes discussed above.

In addition, monofilament-based fabrics are generally more robust than are the open-structure, multifilament-based fabrics taught in the aforementioned prior art references.

Furthermore, the cross-sections of monofilament yarns are generally stiffer than those of multifilament yarns. Thus, large-diameter monofilament yarns do not normally flatten during the deformation process. Monofilament yarns with a round cross-section will provide maximum bending stiffness, while monofilament yarns with a non-round cross-section will twist, rather than flatten, to present a softer cross-section. The integrity of the monofilament cross-section assures a uniform, controllable flex modulus. On the other hand, the multifilament yarns used in the prior art network structures are relatively delicate and tend to flatten to form the softest cross-section, i.e., a ribbon, during the network-forming process, thereby limiting the achievable compression modulus.

Furthermore, the fiber network structure of this invention is surprisingly stiff when compared to the resilient, unbonded monofilament network structures disclosed in copending, commonly assigned U.S. patent application Ser. No. 08/577,655 to Kim et al., which was previously mentioned herein. Although the monofilament-based network structure of this invention is not as resilient as the unbonded monofilament networks, the network structure of this invention retains a higher percentage of its initial stiffness and recovery properties than do the prior art multifilament-based network structures taught in, for example, U.S. Pat. Nos. 4,631,221 and 5,364,686.

Like prior art rigid networks, the network structure of the present invention is bonded at the fiber crossover points. Consequently, the bending is localized and the resistance to compression rises rapidly. However, because the intrinsic stiffness of the network segments derives from both the fibers themselves and the bonding material, as network compression increases, the local stress will exceed the strength of the fiber crossover bonds before the fibers can kink. When the bonds break, the deformation redistributes over longer fiber lengths. The material yields, i.e., it becomes softer but it retains its ability to recover from deformation. When the compression is removed, the network height will be recovered. Resistance to subsequent compression will be reduced but still significant. If, after recovery, the broken bonds are reconnected, e.g., by adding additional "glue" or by re-melting the low melt thermoplastic, the network can be repaired and regain its original stiffness.

In addition, the monofilament-based rigid network structure of this invention has greater post-yield dimensional recovery properties than do the conventional multifilament-based rigid network structures of the prior art. In other words, the rigid network structures of this invention are less prone to experiencing catastrophic collapse after yield than are the prior art structures.

The method of this invention also has several advantages.

For example, the method of this invention is easier to control than are the prior art processes using multifilament yarn.

In addition, the method of this invention is more economically viable than are the multifilament-based methods of the prior art because network structures can be formed much faster with the monofilament-based method of this invention than with the multifilament-based prior art processes. The thermal memory of semi-crystalline, oriented monofilaments is strongly dependent upon the maximum temperature the monofilaments have reached but only weakly dependent upon the time spent at that temperature. Consequently, demolding of the monofilament-based network structure of this invention can be accomplished as soon as the deformed fabric reaches the desired temperature. If the deformable fabric is preheated close to but below the final temperature, cycle times can be reduced to as low as a few seconds. On the other hand, because multifilament networks cannot support their own weight unless the individual fibers are bonded together, prior art network-forming processes using multifilament yarns require that the thermoset resin be cured or the lower melting thermoplastic polymer be solidified prior to removing the network structure from the mold, i.e., the curing operation is delayed until after the network structure has been formed. Thus, the use of semi-crystalline, oriented monofilaments in the method of this invention allows the network structure of this invention to be formed more rapidly than the multifilament-based network structures of the prior art.

DETAILED DESCRIPTION OF THE INVENTION

As stated hereinabove, the present invention provides a three-dimensionally shaped fiber network structure having improved rigidity and ductility. In addition, the present invention provides methods of making the network structure, as well as articles composed of such network structure.

The three-dimensionally shaped fiber network structure of this invention has an open-mesh, filigree-like appearance and is composed of a deformed textile fabric made by subjecting a deformable textile fabric to an area-enlarging deformation process carried out at elevated temperature in a shaping mold. The deformed textile fabric has a base region and a plurality of deformations disposed as a two-dimensional array along and across the base region.

The deformable textile fabric is preferably either a knitted or woven fabric. Knitted fabrics are drapable and can be readily deformed without excessive elongation of the individual fibers therein, which can lead to breakage of the fibers. Woven fabrics can be more readily produced from large-diameter monofilaments.

The deformed fabric contains (A) at least one oriented, semi-crystalline monofilament yarn formed from a first thermoplastic polymer, and (B) a second thermoplastic polymer having a melting point which is lower than the melting point of the first thermoplastic polymer and higher than the glass transition temperature of the first thermoplastic polymer.

The deformed fabric has a plurality of monofilament cross-over points therein. The term "monofilament cross-over points" is used herein to refer to those points in the deformed fabric wherein the monofilament yarn crosses over (intersects) itself. Prior to the deformation process, the monofilament cross-over points are not bonded to each other. In the deformed fabric, the monofilament cross-over points remain unbonded to one another until the molten second thermoplastic polymer has hardened. The hardening of the molten polymer effects bonding of all or substantially all of the monofilament cross-over points. Thus, the second thermoplastic polymer functions as a bonding agent for the monofilament cross-over points. The bonding operation is preferably completed after the three-dimensional network structure has been formed and removed from the shaping mold.

The yarn used in the present invention is composed of a semi-crystalline, oriented monofilament formed from a first thermoplastic polymer. In the monofilament, the polymer chains are preferably oriented parallel to the axis of the monofilament so as to increase filament strength and modulus. The thermoplastic monofilament is preferably formed by a melt-spinning process, followed by a stretching or drawing process which preferably orients the polymer chains parallel to the filament axis. Orientation of the polymer chains may be effected during the spinning process or during a post-extrusion drawing process. The orientation step may be followed by an annealing step which helps to lock in the orientation and may increase the crystallinity levels in the monofilament.

The thermoplastic polymer used to form the monofilament is preferably a crystallizable, melt-spinnable thermoplastic polymer, more preferably a semi-crystalline, fiber-forming thermoplastic polymer. Non-limiting examples of suitable semi-crystalline polymers include poly(alkylene terephthalates), poly(alkylene naphthalates), poly(arylene sulfides), aliphatic and aliphatic-aromatic polyamides, and polyesters comprising monomer units derived from cyclohexanedimethanol and terephthalic acid. Examples of specific semi-crystalline polymers include poly(ethylene terephthalate), poly(butylene terephthalate), poly(ethylene naphthalate), poly(phenylene sulfide), poly(1,4-cyclohexanedimethanol terephthalate) (wherein the 1,4-cyclohexanedimethanol is a mixture of cis and trans isomers), nylon 6 and nylon 66. Polyolefins, particularly polyethylene and polypropylene, are other semi-crystalline polymers that may be used in this invention.

Preferred classes of such thermoplastic polymers include, for example, polyesters, polyamides, polyarylene sulfides, polyolefins, aliphatic-aromatic polyamides, and polyacrylates.

Preferred polyesters include the polyesters of alkylene glycols having from about 2 to about 10 carbon atoms and aromatic diacids. Polyalkylene terephthalates, especially polyethylene terephthalate and polybutylene terephthalate are particularly preferred. Also preferred are polyalkylene naphthalates, which are polyesters of 2,6-naphthalenedicarboxylic acid and alkylene glycols, such as, for example, polyethylene naphthalate.

Preferred polyamides are nylon 6 and nylon 66, which are commonly used in making fibers.

The preferred polyarylene sulfide is polyphenylene sulfide.

The preferred polyolefins are polyethylene and polypropylene.

The preferred aliphatic aromatic polyamides include polyamides derived from terephthalic acid and 2-methyl-1,5-pentanediamine.

Specific preferred polymers for use in the monofilament yarn used in the present invention include polyethylene terephthalate ("PET"), nylon 6, nylon 66, polypropylene, polybutylene terephthalate ("PBT"), and polyethylene.

The thermoplastic polymer used to form the monofilament used in this invention preferably has a melting point of from about 80° C. to about 375° C.

Non-limiting examples of thermoplastic polymers which can be used as the second thermoplastic polymer in the present invention include substituted polyalkylenes, unsubstituted polyalkylenes, poly(alkylene terephthalates), partly aromatic polyamides, wholly aromatic polyamides, polyether ketones, polyether ether ketones, polyether sulfones, polysulfones, poly(phenylene sulfides), polyacrylates, polyvinyl chloride and polyetherimides. Preferred thermoplastic polymers for use as the second thermoplastic polymer in the present invention include, e.g., polyethylene, polypropylene, poly(ethylene terephthalate), poly(butylene terephthalate), polyetherimide, and polyether ketone.

The monofilament yarn used in the present invention has a relatively large diameter. The monofilament yarn has a diameter of preferably at least about 0.10 millimeter and more preferably from about 0.10 to about 3.00 millimeters. Because of its large diameter, the monofilament yarn easily maintains its three-dimensional shape after the deformation process without the benefit of a stiffening system such as a thermoset resin or a second thermoplastic polymer. As mentioned previously herein, the stiffness of the large-diameter monofilament yarn is the primary source of the stiffness of the network structure of this invention. This is because the stiffness of a fiber is a cubic function of its diameter. Thus, doubling the diameter of a fiber will make the fiber eight times stiffer. Therefore, because the present invention uses a large-diameter monofilament yarn, the choice and quantity of the bonding agent are much less critical in the present invention than is the case for the prior art rigid network structures using multifilaments.

The monofilament yarn used in the present invention preferably has a circular cross-section. Non-round cross-sections have variable stiffness, depending upon the plane in which the cross-sections are bent. Both the fabric-forming process and the deformation process will tend to rotate non-round yarns so that the softest moment is the one most likely to be flexed. Consequently, the bending resistance and compression stiffness of networks formed from non-round monofilaments and networks formed from multifilament yarns will always be less than that of the equivalent monofilament having a circular cross-section.

The second thermoplastic polymer may be present in the monofilament itself or as a separate monofilament or multifilament yarn. For example, the monofilament may be in the form of a bicomponent fiber containing the first thermoplastic polymer as one component and the second thermoplastic polymer as the second component. Preferably, such bicomponent fiber will have a sheath-core structure wherein the second thermoplastic polymer will constitute the sheath phase and the first thermoplastic polymer will make up the core phase. Such a sheath/core configuration having the lower melting second thermoplastic polymer in the sheath and the higher melting thermoplastic polymer in the core assures that all or substantially all of the monofilament cross-over points will be bonded in the deformed network structure. Since the lower melting thermoplastic polymer will be disoriented and will lose its stiffness when it is melted and re-solidified, the lower melting second thermoplastic polymer will make little intrinsic contribution to the load-bearing capability of the final network structure while adding weight and cost. Therefore, the amount of the sheath (i.e., second) thermoplastic polymer is preferably limited to that amount necessary to effect satisfactory melt extrusion and subsequent network bonding.

If the second thermoplastic polymer is present as a separate monofilament or multifilament yarn, it is preferably wrapped around the monofilament yarn formed from the first thermoplastic polymer. In such case, the monofilament yarn formed from the first thermoplastic polymer is preferably a monocomponent fiber.

Alternatively, the second thermoplastic polymer may be present as a powdered coating applied to the deformable fabric prior to the deformation process but after the fabric-forming process.

The melting point of the second thermoplastic polymer used herein is lower than the melting point of the first thermoplastic polymer. The melting point of the second thermoplastic polymer should be low enough to ensure that, during the deformation process, the higher melting first thermoplastic polymer does not soften and begin to disorient. Preferably, the melting point of the second thermoplastic polymer will be at least 30° C. lower than the melting point of the first thermoplastic polymer.

Furthermore, the melting point of the second thermoplastic polymer should exceed the glass transition temperature of the first thermoplastic polymer, thereby ensuring that the higher melting first thermoplastic polymer can be effectively stretched and heat-set into the deformed geometry. As discussed later herein, the deformation step of the method of this invention is carried out at a temperature which is higher than the melting point of the second thermoplastic polymer but below the softening, disorientation point of the first thermoplastic polymer.

The present invention further provides a method of making the network structure of this invention. A first embodiment of the method of this invention involves the steps of:

(1) providing a fabric-forming composition containing the above-described (a) oriented, semi-crystalline monofilament yarn(s) formed from a first thermoplastic polymer and (b) the second thermoplastic polymer, the second thermoplastic polymer having a melting point which is lower than the melting point of the first thermoplastic polymer and higher than the glass transition temperature of the first thermoplastic polymer;

(2) subjecting the fabric-forming composition to a fabric-forming process so as to form a deformable fabric having a plurality of monofilament cross-over points;

(3) subjecting the deformable fabric to an area-enlarging deformation process in a shaping mold at an elevated temperature so as to form an initial, resilient, self-supporting network structure composed of a deformed fabric having a three-dimensional shape, the deformed fabric containing a base region and a plurality of deformations disposed as a two-dimensional array on the base region, the elevated temperature being higher than the melting point of the second thermoplastic polymer and lower than the melting point of the first thermoplastic polymer so as to melt the second thermoplastic polymer and permanently deform the first thermoplastic polymer, the molten second thermoplastic polymer being disposed in contact with the monofilament cross-over points, the initial network structure having sufficient stiffness to maintain the three-dimensional shape thereof prior to hardening of the molten second thermoplastic polymer;

(4) removing the initial network structure from the mold; and (5) in the demolded network structure, causing the molten second thermoplastic polymer to harden so as to bond the monofilament cross-over points, thereby converting the initial network structure into a rigid three-dimensionally shaped network structure having improved post-yield dimensional recovery.

The fabric-forming composition contains the monofilament yarn(s) and the second thermoplastic polymer. As mentioned previously herein, the monofilament yarn(s) and the second thermoplastic polymer may be disposed in a single bicomponent monofilament, wherein the first thermoplastic polymer is one component and the second thermoplastic polymer is the second component.

Alternatively, the fabric-forming composition may contain a mixture of yarns composed of the monofilament yarn formed from the first thermoplastic polymer and either a second monofilament yarn or a multifilament yarn formed from the second thermoplastic polymer.

In another embodiment of the method of this invention, the fabric-forming composition contains only the monofilament yarn formed from the first thermoplastic polymer, with the second thermoplastic polymer being subsequently added in the form of a powder coating or emulsion onto the deformable fabric prior to the deformation step and after the fabric-forming step.

The fabric-forming process used in the method of this invention to form the deformable fabric is preferably knitting or weaving. Thus, in preferred embodiments, the deformable fabric is a knitted or woven fabric.

The deformable textile fabric preferably contains from about 10 to about 90 parts by weight of the monofilament yarn(s) and from about 90 to about 10 parts by weight of the second thermoplastic polymer. More preferably, the deformable textile fabric contains from about 50 to about 90 parts by weight of the monofilament yarn(s) and from about 10 to about 50 parts by weight of the second thermoplastic polymer. Most preferably, the deformable sheet-like textile fabric contains about 75 to about 90 parts by weight of the monofilament yarn(s) and from about 10 to about 25 parts by weight of the second thermoplastic polymer.

In the method of this invention, the deformable textile fabric undergoes an area-enlarging deformation process in a shaping mold at an elevated temperature. As used herein, the term "area-enlarging" with respect to the deformation process refers to the enlarging of the surface area of the base region of the deformable fabric in which such deformations are formed. As discussed hereinabove, the deformation step of the method of this invention is carried out at a temperature which is higher than the melting point of the second thermoplastic polymer but below the melting (i.e., softening, disorientation point) of the first thermoplastic polymer. The deformation step is carried out at a temperature which is high enough to cause the second thermoplastic polymer to melt and the deformable fabric to become permanently deformed, as would occur, e.g., in a fiber-drawing process.

The deformation of the deformable fabric is preferably brought about by using a thermomechanical process, wherein a mechanical force is applied to the deformable fabric at an elevated temperature. The mechanical force can be applied using numerous methods such as, e.g., solid phase pressure forming, vacuum bladder match plate molding, interdigitation, deep drawing, use of a heated mold, and the like. Heat and pressure are applied to the deformable fabric for a sufficient time that the textile fabric is permanently deformed but not for such a long time or at such a high temperature (e.g., approaching the crystalline melting point) that the semi-crystalline, oriented monofilament yarn begins to soften and lose orientation.

The area-enlarging deformation step of the method of this invention is preferably a deep-drawing process and the shaping mold is preferably a deep-drawing mold.

The method of this invention can be accelerated by preheating the deformable fabric to a temperature close to the elevated temperature used in the deformation process. If the fabric is preheated close to but below the final temperature, cycle times can be reduced to a few seconds. For highest quality, the highest temperature used in the deformation process should be the final configuration temperature.

The initial deformed textile fabric formed in the deformation step will be in the form of a three-dimensionally shaped fiber network structure which is resilient and self-supporting. As used herein, the term "initial deformed textile fabric" refers to the deformed fabric formed in the deformation process but in which the molten second thermoplastic polymer has not yet hardened. In the initial deformed textile fabric, the monofilament cross-over points are not yet bonded together. Such bonding occurs when the molten second thermoplastic polymer has hardened.

As used herein with respect to the initial deformed textile fabric, the term "self-supporting" means that the initial fabric is sufficiently stiff that it can retain its structure and be removed from the shaping mold prior to the hardening of the molten second thermoplastic polymer.

After the deformation process, the resulting initial network structure is removed from the mold. One of the benefits of using the semi-crystalline, oriented monofilament yarn in the present invention is that the thermal memory of semi-crystalline, oriented monofilaments is strongly dependent upon the maximum temperature they have experienced, but only weakly dependent upon the time spent at that temperature. Consequently, in the method of this invention, demolding can be accomplished as soon as the deformed fabric reaches the desired temperature during the deformation process. Unlike the prior art process described in U.S. Pat. No. 5,364,686, it is not necessary to cool the mold before the deformed fabric can be removed.

In preferred embodiments of the method of this invention, the initial network structure is removed from the shaping mold promptly upon formation of such network structure such that hardening of the molten second thermoplastic polymer occurs completely outside the shaping mold. However, if desired, the initial network structure may be allowed to remain in the shaping mold while the molten second thermoplastic polymer is being hardened or, alternatively, the initial network structure may be removed from the shaping mold while the molten polymer is in a partially hardened state.

To effect hardening of the molten second thermoplastic polymer, the initial deformed structure is cooled to a temperature below the melting point of the second thermoplastic polymer.

Upon hardening of the molten second thermoplastic polymer, the monofilament cross-over points become bonded to one another via the hardened polymer. The resilient network structure is thereby converted into a final three-dimensionally shaped fiber network structure which is rigid, light-weight and extremely porous in all directions and which has improved post-yield dimensional recovery.

The final network structure formed by the method of this invention is rigid and dimensionally resilient. That is, the resistance of the network structure to compression rises rapidly as the structure is compressed. At a high load, the material will yield, that is, there is a sudden softening of the network structure such that additional compression is accomplished by adding only slightly higher loads. When the compression is removed, much of the original network height will be recovered. However, resistance to compression is now much lower, i.e., the network structure has become soft.

The rigid network structure of this invention has an open-mesh, filigree-like structure. The network structure contains a base region and a plurality of deformations disposed as a two-dimensional array on the base region. As used herein, the term "two-dimensional array" means that the multiple deformations are disposed both along the length and along the width of the plane of the base region.

The deformations may be arranged on the base region in a non-uniform or uniform pattern. Preferably, the deformations are arranged on the base region in a repetitive or uniform pattern with uniform spacing.

As used herein, the term "deformations" is meant to include projections and/or depressions formed on the base region by means of an area-enlarging process which increases the surface area of the deformable fabric, i.e., the deformed fabric has a greater surface area than the deformable fabric from which it was formed. As used herein, the term "projections" refers to portions of the deformed textile fabric which extend upwardly from a first face of the base region of the deformed fabric. The term "depressions" is used herein to refer to portions of the deformed textile fabric which extend downwardly from a first face of the base region into the deformed textile fabric. The direction in which the depressions extend is substantially opposite to the direction in which the projections extend.

During the area-enlarging deformation (shaping) process, the deformable fabric undergoes stretching so as to form the deformations therein. The surface area of the resulting deformed fabric will be larger than that of the undeformed fabric, typically more than about 25% larger.

The deformations in the network structure of this invention are stretched structures as opposed to, e.g., corrugations which are not stretched but merely folded structures. The deformations can extend from the base region of the deformed fabric by a distance of several times the thickness of the fabric, thereby giving the network structure a much greater thickness and much lower apparent density than the deformable fabric.

A variety of shapes are possible for the deformations produced in the fiber network structure of this invention by the area-enlarging step. For example, the deformations can be in the form of elongated ridges, zig-zag patterns, ellipses, cones or truncated cones, pyramids or truncated pyramids on different polygonal bases, cylinders, prisms, spherical elements and the like. The deformations may have a circular or polygonal base, or may be bar-shaped. Furthermore, deformations disposed on a common base region of a deformed textile fabric formed in the present invention can vary in shape from one another, i.e., the deformations on a particular base region do not all have to be the same shape.

Preferably, the apex points or top surfaces of projections define a first surface, which is a plane parallel to the plane of the base region of the deformed textile fabric from which the projections extend. Similarly, the apex points or bottom surfaces of depressions, if present, preferably define a second surface, which is also preferably a plane parallel to the plane of the base region. As a result, the preferred three-dimensional networks of this invention have two surfaces or planes, one being defined by the top surfaces of the projections and the other being defined by either the base region of the textile fabric or the bottom surfaces of the depressions.

Depending on the use thereof, the fiber network structure of this invention may have a variety of deformations. Specifically, the shapes, heights, sizes and spacings of the deformations can be modified to suit a specific application. For example, the deformations may be modified to conform to a specific shape, e.g., an elliptical shape.

The shapes of the deformations depend on the process used to make them. For example, in a deformation process in which the textile fabric is held against a plate with round holes and a cylindrical rod is pushed through the hole on the same side as the textile fabric so that the textile fabric is stretched and forced into the hole, the resulting projections made in the textile fabric will be in the shape of truncated cones (i.e., the base and top of the projections will both be round), with the diameter of the top of the cone being the diameter of the rod that pushes the textile through the hole. Similarly, if a plate with square holes and a rod with a square cross section are used, the projections will be in the shape of truncated pyramids.

Corrugated or pleated geometries, which are formed by folding rather than by an area-enlarging process, are undesirable for the fabrics of this invention because corrugated or pleated geometries are unstable under forces perpendicular to the direction of the folds. Under compression, the corrugated structure is characterized by yield followed by a negative compression modulus, that is, after a relatively small deformation, typically 5% to 10%, the structure collapses completely under load, returning to their original flat shape. The structure may recover from collapse but will be prone to flex fracture at the fold line.

Three-dimensionally shaped fiber network structures which have deformations like those which can be present in the structure of this invention are disclosed, for example, in U.S. Pat. Nos. 5,158,821; 5,447,776; 4,631,221; and 5,364,686; each of the foregoing references being hereby incorporated by reference herein.

The present invention further provides articles containing the three-dimensionally shaped fiber network structure of this invention.

Because of its properties, the fiber network structure of this invention is useful as a core in sandwich panels, spacers in double-walled pipes and vessels, as ventilation spacers between structural elements, drainage systems, energy absorption structures, ground stabilization, embedded reinforcements, shapable forms and architectural products.

The stiffness and load-bearing capabilities of the network structure of this invention are determined primarily by the stiffness of the individual monofilament fibers and the strength of the fiber-to-fiber bonds. The rigidity of the individual fibers is determined by their diameters, their level of molecular orientation, their cross-sectional shape, and the intrinsic stiffness of the thermoplastic polymer used to form such monofilaments. The strength of the bonds is controlled by the type and level of the second thermoplastic polymer which is used as the bonding agent. The sizes, heights and shapes of the deformations and the spacings of the pattern of deformations also affect the rigidity of the three-dimensional network structure of this invention. Thus, depending on the stiffness of the fibers, the bonding system, and the geometry of the network structure, the network structure of this invention may be used as structural materials, energy-absorbing materials or as embedded reinforcements.

The following non-limiting examples illustrate the present invention.

EXPERIMENTAL

EXAMPLE 1

A plain Jersey knit fabric was prepared by simultaneously knitting a 180 micron polyester monofilament and a 180 micron polyethylene monofilament. The fabric was placed on a preheated aluminum plate with a 16-inch square array of ¼-inch diameter holes drilled in at ½-inch intervals. Plate temperature was approximately 220° C., well above the melting temperature of the polyethylene but below the softening temperature of the polyester. A second aluminum plate, also preheated to 220° C., was placed on top of the fabric. The top plate contained an array of ⅛-inch diameter pins positioned so as to fit into the holes in the bottom plate. A load of approximately 400 pounds was applied to the top plate such that the pins forced the fabric to stretch into the holes in the bottom plate. The molds were separated without allowing them to cool. A rigid, brittle three-dimensionally shaped network structure composed of an array of conical frustums projecting approximately ¹⁄₁₀ inch from the plane of the base fabric was obtained.

EXAMPLE 2 AND CONTROL A

In each of Example 2 and Control A, an 11-gauge plain knit fabric was formed by knitting a 180-micron polyester monofilament and a 150-denier 33-filament textured polyester. In Example 2, the fabric was coated with a hot melt adhesive and then formed into a lightweight resilient three-dimensionally shaped fiber network structure. Thus, in Example 2, no cooling occurred prior to demolding. In Control A, the fabric was left uncoated prior to the forming process. The network formed in Example 2 was eleven times stiffer than the untreated control of Control A while gaining only 30% in weight. The Example 2 network was not resilient, yielding at a compression of 35%.

EXAMPLE 3 AND CONTROL B

In Example 3 and Control B, two knit fabrics were prepared in an 8-gauge, plain Jersey construction from 300-micron monofilament yarns. The fabric formed in Example 3 contained a monofilament that was 50% by weight polyester and 50% by weight polyethylene. The polyethylene enveloped the polyester in a sheath-core configuration. The fabric formed in Control B contained 100% polyester monofilaments. Both of the fabrics were formed so as to exhibit ⅜-inch diameter conical frustums projecting from the plane of the base region of the fabric in a ¾-inch square pattern. In both cases, molding temperatures were 180° C. and the fabrics were removed from the molds without any precooling. Microscopic examination showed that the bicomponent filaments of Example 3 were essentially undeformed except at the monofilament cross-over points where the polyethylene had fused to form a continuous bonding phase. The cross-over points of the 100% polyester network in Control Example B were not bonded. The load and yield compression properties of the network structures formed in Example 3 and Control B are set forth in Table I below.

TABLE I

Example 3 and Control B:
Load and Yield Compression Properties

| Property | Example No. 3 | B |
|---|---|---|
| Load at 25% (psi) | 5.2 | 0.95 |
| Yield Compression | 40% | none |
| Load at 25% after yield (psi) | 1.0 | 0.95 |
| Sample Weight (16 in²) | 2.86 | 2.73 |

As indicated by the data presented in Table I above, the 100% polyester network of Control B was resilient, capable of being repeatedly compressed up to 50% without loss of stiffness. The heterofilament network of Example 3 was 550% stiffer than the homofilament network of Control Example B as measured by load necessary to compress both networks by 25%. The heterofilament network could be repeatedly compressed by 25% without loss of stiffness or height. However, when compressed to 40%, the heterofilament network exhibited a distinct yield. The heterofilament network recovered 85% of the 60% compression (or 91% of its original height). Compression resistance at 25% after yield was only about 20% of the pre-yield value, i.e., roughly equivalent to the stiffness of the unbonded network of Control B.

What is claimed is:

1. A rigid three-dimensionally shaped fiber network structure having improved post-yield dimensional recovery, comprising a deformed sheet-like textile fabric having a base region and a plurality of deformations formed as a two-dimensional array on the base region, wherein the deformed fabric contains:

(A) at least one oriented, semi-crystalline monofilament yarn formed from a first thermoplastic polymer, the monofilament yarn being disposed in the deformed fabric so as to provide a plurality of monofilament cross-over points therein; and (B) a second thermoplastic polymer, the second thermoplastic polymer being disposed in the fabric so as to effect bonding of all or substantially all of the monofilament cross-over points, the second thermoplastic polymer having a melting point which is lower than a melting point of the first thermoplastic polymer and higher than a glass transition temperature of the first thermoplastic polymer.

2. A network structure according to claim 1, wherein the monofilament yarn has a diameter of at least 0.10 millimeter.

3. A network structure according to claim 1, wherein the monofilament yarn has a diameter of from about 0.10 to about 3.00 millimeter.

4. A network structure according to claim 1, wherein the melting point of the second thermoplastic polymer is at least 10° C. lower than the melting point of the first thermoplastic polymer.

5. A network structure according to claim 1, wherein the melting point of the second thermoplastic polymer is at least about 30° C. lower than the melting point of the first thermoplastic polymer.

6. A network structure according to claim 1, wherein the first thermoplastic polymer is a semi-crystalline polymer selected from the group consisting of poly(alkylene terephthalates), poly(alkylene naphthalates), poly(arylene sulfides), aliphatic polyamides, aliphatic-aromatic polyamides, polyolefins, and polyesters comprising monomer units derived from cyclohexanedimethanol and terephthalic acid.

7. A network structure according to claim 1, wherein the first thermoplastic polymer is a semi-crystalline polymer selected from the group consisting of poly(ethylene terephthalates), poly(butylene terephthalates), poly(ethylene naphthalates), poly(phenylene sulfides), nylon 6, nylon 66, polyethylene, polypropylene, and poly(1,4-cyclohexanedimethanol terephthalate) wherein the 1,4-cyclohexanedimethanol is a mixture of cis and trans isomers.

8. A network structure according to claim 1, wherein the second thermoplastic polymer is selected from the group consisting of substituted polyalkylenes, unsubstituted polyalkylenes, poly(alkylene terephthalates), partly aromatic polyamides, wholly aromatic polyamides, polyether ketones, polyether ether ketones, polyether sulfones, polysulfones, poly(phenylene sulfides), polyacrylates, polyvinyl chloride and polyetherimides.

9. A network structure according to claim 1, wherein the second thermoplastic polymer is selected from the group consisting of polyethylene, polypropylene, poly(ethylene terephthalate), poly(butylene terephthalate), polyetherimide, and polyether ketone.

10. A network structure according to claim 1, wherein the first thermoplastic polymer has a melting point of from about 80° C. to about 375° C.

11. A network structure according to claim 1, wherein the deformed fabric is a knitted or woven fabric.

12. A network structure according to claim 1, wherein the monofilament yarn is a monocomponent fiber.

13. A network structure according to claim 1, wherein the monofilament yarn is a bicomponent fiber having two components, wherein a first component comprises the first thermoplastic polymer and a second component comprises the second thermoplastic polymer.

14. A network structure according to claim 13, wherein the bicomponent fiber has a sheath-core structure, wherein the core comprises the first thermoplastic polymer and the sheath comprises the second thermoplastic polymer.

15. A network structure according to claim 1, wherein said deformations include (i) projections extending outwardly from a first face of said base region of said deformed fabric in a direction which is substantially perpendicular to said first face of said base region or (ii) depressions extending inwardly from said first face of said base region of said deformed fabric in a direction which is substantially perpendicular to said first face of said base region.

16. A network structure according to claim 1, wherein said deformations include (i) projections extending outwardly from a first face of said base region of said deformed fabric in a direction which is substantially perpendicular to said first face of said base region and (ii) depressions extending inwardly from said first face of said base region of said deformed fabric in a direction which is substantially perpendicular to said first face of said base region.

* * * * *